United States Patent
Zhang et al.

(10) Patent No.: US 11,965,076 B2
(45) Date of Patent: Apr. 23, 2024

(54) SELF-HEALING POLYURETHANE (PU) MATERIAL, DOUBLE-LAYER SELF-HEALING PU FILM, AND PREPARATION METHOD AND USE THEREOF

(71) Applicant: Lanzhou Institute of Chemical Physics, CAS, Lanzhou (CN)

(72) Inventors: Xinrui Zhang, Lanzhou (CN); Jing Xu, Lanzhou (CN); Xiaoyue Wang, Lanzhou (CN); Zenghui Yang, Lanzhou (CN); Yaoming Zhang, Lanzhou (CN); Qihua Wang, Lanzhou (CN); Tingmei Wang, Lanzhou (CN)

(73) Assignee: Lanzhou Institute of Chemical Physics, CAS (CN)

( * ) Notice: Subject to any disclaimer, the term of this patent is extended or adjusted under 35 U.S.C. 154(b) by 0 days.

(21) Appl. No.: 18/139,146

(22) Filed: Apr. 25, 2023

(65) Prior Publication Data

US 2023/0407025 A1    Dec. 21, 2023

(30) Foreign Application Priority Data

Jun. 16, 2022 (CN) .......................... 202210682820.8

(51) Int. Cl.
| | | |
|---|---|---|
| *C08J 7/04* | (2020.01) | |
| *C08G 18/24* | (2006.01) | |
| *C08K 5/3462* | (2006.01) | |

(52) U.S. Cl.
CPC .............. *C08J 7/04* (2013.01); *C08G 18/242* (2013.01); *C08K 5/3462* (2013.01); *C08J 2375/04* (2013.01)

(58) Field of Classification Search
CPC ........................ C08J 2375/04–08; C08J 7/042
See application file for complete search history.

(56) References Cited

U.S. PATENT DOCUMENTS

| | | | | |
|---|---|---|---|---|
| 4,218,500 A | * | 8/1980 | Radisch | ............ B32B 17/10761 428/424.4 |
| 4,683,171 A | * | 7/1987 | Kuga | .................. B32B 17/1077 427/520 |
| 2014/0072809 A1 | * | 3/2014 | Ryan | ...................... F41H 5/0407 428/423.1 |
| 2018/0222159 A1 | * | 8/2018 | Nielsen | .................. B32B 27/40 |

OTHER PUBLICATIONS

Wang et al., "Preparation and characterization of a self-healing polyurethane," Thermosetting Resin, Jan. 2021, vol. 36, No. 1, pp. 23-26.

(Continued)

*Primary Examiner* — Michael M Dollinger
(74) *Attorney, Agent, or Firm* — Dickinson Wright PLLC

(57) ABSTRACT

Provided are a self-healing polyurethane (PU) material, a double-layer self-healing PU film, and a preparation method and use thereof. In the disclosure, the self-healing PU material includes a PU material I and a PU material II that are packaged separately. A soft-layer PU film prepared based on the PU material I and a hard-layer PU film prepared based on the PU material II could be combined to form a double-layer PU film.

13 Claims, 4 Drawing Sheets

(56) References Cited

OTHER PUBLICATIONS

Song et al., "Towards Dynamic but Supertough Healable Polymers through Biomimetic Hierarchical Hydrogen-Bonding Interactions," Angewandte Chemie, 2018, pp. 13838-13842, China.

Sijbesma et al., "Reversible Polymers Formed from Self-Complementary Monomers Using Quadruple Hydrogen Bonding," Science, Nov. 1997, pp. 1601-1604, vol. 278, Netherlands.

Li et al., "Towards Dynamic, but Supertough Healable Polymers via Biomimetic Hierarchical Hydrogen Bonding Interaction," Angewandte Chemie, 29 pages, China.

Xu et al., "Recent advances in high-strength and high-toughness polyurethanes based on supramolecular interactions," Polymer Chemistry, 2022, pp. 2420-2441, China.

Xiangliao, "Controlled release technology for tobacco flavoring and its application," 4 pages, 2016.

First Office Action with English Translation for Chinese Application No. 202210682820.8, dated Dec. 8, 2022, 16 pages.

\* cited by examiner

SELF-HEALING POLYURETHANE (PU) MATERIAL, DOUBLE-LAYER SELF-HEALING PU FILM, AND PREPARATION METHOD AND USE THEREOF

CROSS REFERENCE TO RELATED APPLICATION

This patent application claims the benefit and priority of Chinese Patent Application No. 202210682820.8 filed with the China National Intellectual Property Administration on Jun. 16, 2022, the disclosure of which is incorporated by reference herein in its entirety as part of the present application.

TECHNICAL FIELD

The present disclosure relates to the technical field of PU materials, in particular to a self-healing polyurethane (PU) material, a double-layer self-healing PU film, and a preparation method and use thereof.

BACKGROUND ART

With the continuous progress and development of modern science and technology, the global demand for polymer materials with excellent functions increases annually. PU, as a new type of polymer material, has excellent wear resistance, ozone resistance, low temperature resistance, and corrosion resistance, thus having broad application prospects in many fields such as aerospace, automobile, textile, construction, medical, intelligent detection. Self-healing materials could achieve self-healing after damage, and restore their original structure and functions after a certain period of time, which makes it possible to extend the service life, improve the use safety, and reduce the maintenance cost of such materials, as well as reduce the waste of resources. Nowadays, introducing a self-healing ability into the polymer materials has become a new trend in the development of polymer materials. When being mechanically or functionally damaged, these polymer materials with self-healing function could be restored to original state or closely original state under certain conditions, thus prolonging the service life of the material and reducing maintenance costs.

In recent years, self-healing PU materials have attracted much attention due to recyclability and broad application prospects. However, it is difficult for the current self-healing PU materials to have both mechanical property and self-healing property, which limits the practical application of self-healing PU materials in the fields of automotive coatings, wearable electronics, soft robotics, flexible electronics, and biomedicine.

SUMMARY

An object of the present disclosure is to provide a self-healing PU material, a double-layer self-healing PU film, and a preparation method and use thereof. Based on the self-healing PU material provided by the present disclosure, a double-layer self-healing PU film can be prepared with excellent self-healing ability and mechanical properties.

To achieve the above object, the present disclosure provides the following technical solutions:

The present disclosure provides a self-healing PU material, including a PU material I and a PU material II that are packaged separately; where the PU material I is prepared from raw materials including a polyol substrate I, a diisocyanate I, a tin-based catalyst I, a T-type chain extender, and a chain extender I at a molar ratio of (10-20):(20-40):(1-3):(2-8):(8-12);

the PU material II is prepared from raw materials including a polyol substrate II, a diisocyanate II, a tin-based catalyst II, the T-type chain extender, a metal salt, and a chain extender II at a molar ratio of (10-20):(20-40):(1-3):(5-10):(2.5-10):(5-10); a metal ion in the metal salt being one or more selected from the group consisting of $Zn^{2+}$, $Cu^{2+}$, $Fe^{3+}$, and $Ni^{2+}$;

the polyol substrate I and the polyol substrate II each are independently selected from the group consisting of a polyester polyol and a polyether polyol; and the T-type chain extender has a structure represented by formula A:

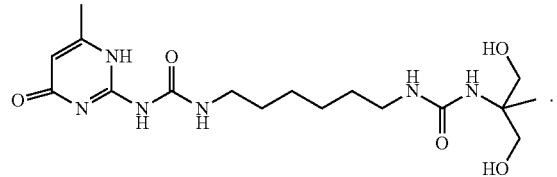

formula A

In some embodiments, the polyol substrate I and the polyol substrate II each independently have a molecular weight of 1,000 g/mol to 2,000 g/mol.

In some embodiments, the diisocyanate I and the diisocyanate II each independently include one selected from the group consisting of hexamethylene diisocyanate (HMDI), isophorone diisocyanate (IPDI), and diphenylmethane diisocyanate (MDI).

In some embodiments, the tin-based catalyst I and the tin-based catalyst II each are dibutyltin dilaurate (DBTDL).

In some embodiments, the chain extender I and the chain extender II each independently include one selected from the group consisting of polyetheramine D230, 1,4-butanediol, ethylene glycol, and propylene glycol.

The present disclosure further provides a double-layer self-healing PU film, including a soft-layer PU film arranged on a surface of a matrix and a hard-layer PU film arranged on a surface of the soft-layer PU film, wherein the soft-layer PU film is prepared from the PU material I of the self-healing PU material; and the hard-layer PU film is prepared from the PU material II of the self-healing PU material.

In some embodiments, the soft-layer PU film and the hard-layer PU film each independently have a thickness of 0.3 mm to 0.6 mm.

The present disclosure further provides a method for preparing the double-layer self-healing PU film described in the above technical solutions, including the following steps:

subjecting a feed solution including the polyol substrate I, the diisocyanate I, and the tin-based catalyst I prepolymerization I to obtain a prepolymerization product system I; mixing the prepolymerization product system I with a solution of the T-type chain extender to obtain a first mixture, and subjecting the first mixture to chain extension I-I to obtain a chain extension product system I-I; and mixing the chain extension product system I-I with the chain extender I to obtain a second mixture, and subjecting the second mixture to chain extension I-II to obtain the PU material I;

subjecting a feed solution including the polyol substrate II, the diisocyanate II, and the tin-based catalyst II to prepolymerization II to obtain a prepolymerization product system II; mixing the prepolymerization product system II with the solution of the T-type chain extender to obtain a third mixture, and subjecting the third mixture to chain extension II-I to obtain a chain extension product system II-I; mixing the chain extension product system II-I with a solution of the metal salt to obtain a fourth mixture, and subjecting the fourth mixture to coordination to obtain a coordination product system; and mixing the coordination product system with the chain extender II to obtain a fifth mixture, and subjecting the fifth mixture to chain extension II-II to obtain the PU material II; and coating the PU material I onto the surface of the matrix to obtain a PU material I film, and subjecting the PU material I film to drying I to obtain the soft-layer PU film; and coating the PU material II onto the surface of the soft-layer PU film to obtain a PU material II, and subjecting the PU material II to drying II to obtain the hard-layer PU film, thereby forming the double-layer self-healing PU film on the surface of the matrix.

In some embodiments, the coordination is conducted at a temperature of 40° C. to 60° C. for 5 h to 12 h.

The present disclosure further provides use of the double-layer self-healing PU film described in the above technical solutions or a double-layer self-healing PU film prepared by the method described in the above technical solutions in a protective coating, wearable electronics, soft robotics, flexible electronics, or a self-healing electrode.

The present disclosure provides a self-healing PU material, including a PU material I and a PU material II that are packaged separately. A soft-layer PU film prepared based on the PU material I and a hard-layer PU film prepared based on the PU material II could be combined to form a double-layer PU film. The double-layer PU film also shows an excellent mechanical strength while having a high self-healing efficiency, thus avoiding the difficulty in simultaneously achieving both self-healing efficiency and mechanical property in traditional self-healing PU materials. In the present disclosure, specifically, the T-type chain extender ((2-ureido-4[H]-pyrimidone)-(2-amino-2-methyl-1,3-propanediol), UPy-AMPD) could self-assemble to form quadruple hydrogen bonds. Introducing the T-type chain extender into the soft-layer PU film and the hard-layer PU film could achieve effective energy dissipation, and bond breaking and recombination, thus making the material have excellent self-healing property and stretchability at ambient temperature. Meanwhile, the metal salt is introduced into the hard-layer PU film, that is, metal coordination bonds are introduced into the hard-layer PU film. Based on a synergistic effect of the quadruple hydrogen bonds and the metal coordination bonds (UPy groups and metal ions form the metal coordination) in a network structure of a polymer system, it is possible to effectively limit the movement of molecular segments in the polymer system, strengthen crystallinity and network density of the chain segments, and regulate the self-healing property of the PU material, and endow the PU material with an excellent strength, thereby achieving effective protection of the soft-layer PU film. In actual application, the soft-layer PU film is used as an inner layer, and the hard-layer PU film is used as an outer layer. The combination of "inner soft and external hard" finally results in a double-layer self-healing PU film having desirable mechanical properties and self-healing ability. Moreover, repeated and rapid self-healing could be achieved without any additional conditions and specific environmental requirements. In addition, the double-layer self-healing PU film has high transparency, excellent wear resistance, desirable durability, and low cost.

DETAILED DESCRIPTION OF THE EMBODIMENTS

Figure 1:
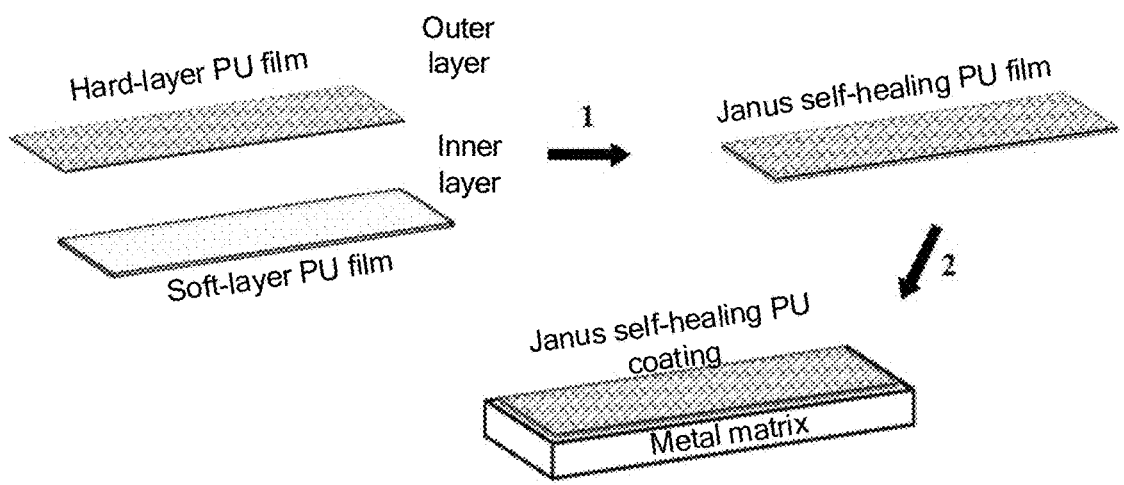
FIG. 1 is a schematic diagram showing that the double-layer self-healing PU film prepared according to an embodiment the present disclosure is used as a protective coating.

The present disclosure provides a self-healing PU material, including a PU material I and a PU material II that are packaged separately; wherein the PU material I is prepared from raw materials including a polyol substrate I, a diisocyanate I, a tin-based catalyst I, a T-type chain extender, and a chain extender I at a molar ratio of (10-20):(20-40):(1-3):(2-8):(8-12);

the PU material II is prepared from raw materials including a polyol substrate II, a diisocyanate II, a tin-based catalyst II, the T-type chain extender, a metal salt, and a chain extender II at a molar ratio of (10-20):(20-40):(1-3):(5-10):(5-10):(5-10); a metal ion in the metal salt being one or more selected from the group consisting of $Zn^{2+}$, $Cu^{2+}$, $Fe^{3+}$, and $Ni^{2+}$;

the polyol substrate I and the polyol substrate II each are independently selected from the group consisting of a polyester polyol and a polyether polyol; and the T-type chain extender has a structure represented by formula A:

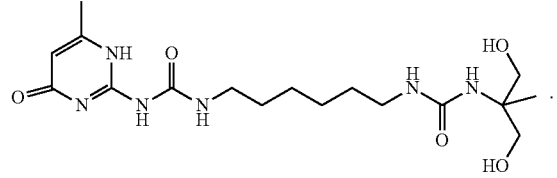

formula A

In the present disclosure, unless otherwise specified, the raw materials used are all commercially-available commodities well known to those skilled in the art or prepared by methods well known to those skilled in the art.

In the present disclosure, the PU material I is prepared from raw materials including a polyol substrate I, a diisocyanate I, a tin-based catalyst I, a T-type chain extender (referred to as a first T-type chain extender), and a chain extender I at a molar ratio of (10-20):(20-40):(1-3):(2-8):(8-12), preferably (10-15):(20-30):(1-2):(2-8):(8-10), and specifically 10:20:1:2:8 or 10:20:1:8:8. In the present disclosure, the polyol substrate I is selected from the group consisting of a polyester polyol and a polyether polyol. In some embodiments, the polyester polyol includes one selected from the group consisting of polytetramethylene glycol (PTMG), polycaprolactone diol (PCL), polyethylene glycol (PEG), and polycarbonate diol (PCDL). In some embodiments, the polyether polyol is polytetramethylene glycol (PTMG). In some embodiments, the polyol substrate I has a molecular weight of 1,000 g/mol to 2,000 g/mol, preferably 1,000 g/mol to 1,500 g/mol. In some embodiments, the diisocyanate I includes one selected from the group consisting of hexamethylene diisocyanate (HMDI), isophorone diisocyanate (IPDI), and diphenylmethane diisocyanate (MDI). In some embodiments, the tin-based catalyst I includes dibutyltin dilaurate (DBTDL). In some embodiments, the chain extender I includes one selected from the group consisting of polyetheramine D230, 1,4-butanediol (BDO), ethylene glycol, and propylene glycol. In the present disclosure, the T-type chain extender has a structure represented by formula A, i.e., a double-hydroxyl-terminated T-type chain extender (UPy-AMPD) with 2-ureido-4-pyrimidinone units. The T-type chain extender could self-assemble to form quadruple hydrogen bonds, thereby achieving effective energy dissipation, and bond breaking and recombination, thus allowing the material to have excellent self-healing and stretchability properties at ambient temperature.

In the present disclosure, the PU material II is prepared from raw materials including a polyol substrate II, a diisocyanate II, a tin-based catalyst II, a T-type chain extender (referred to as a second T-type chain extender), a metal salt, and a chain extender II at a molar ratio of (10-20):(20-40):(1-3):(5-10):(2.5-10):(5-10), preferably (10-15):(20-30):(1-2):(5-7):(2.5-5):(5-7), and specifically 10:20:1:5:5:5 or 10:20:1:5:2.5:5. In some embodiments, the selection ranges of the polyol substrate II, the diisocyanate II, the tin-based catalyst II, and the chain extender II are consistent with those of the polyol substrate I, the diisocyanate I, the tin-based catalyst I, and the chain extender I, which are not repeated here. In the present disclosure, a metal ion in the metal salt is one or more selected from the group consisting of $Zn^{2+}$, $Cu^{2+}$, and $Fe^{3+}$. In some embodiments, the metal salt is a metal hydrochloride, which is specifically one or more selected from the group consisting of $ZnCl_2$, $CuCl_2$, and $FeCl_3$. In the present disclosure, the metal ion could form metal coordination bonds with the UPy groups of the T-type chain extender (UPy-AMPD). A synergistic effect of the metal coordination bonds and the quadruple hydrogen bonds could effectively limit the movement of the molecular chain segments in the polymer system, enhance the crystallinity and network density of the chain segments, and effectively regulates the self-healing property of the PU material and endows the PU material with an excellent strength.

The present disclosure further provides a double-layer self-healing PU film, including a soft-layer PU film arranged on a surface of a matrix and a hard-layer PU film arranged on a surface of the soft-layer PU film, wherein the soft-layer PU film is prepared from the PU material I of the self-healing PU material; and the hard-layer PU film is prepared from the PU material II of the self-healing PU material. In some embodiments, the soft-layer PU film and the hard-layer PU film each independently have a thickness of 0.3 mm to 0.6 mm, preferably 0.4 mm to 0.5 mm. In some embodiments, a matrix suitable for the double-layer self-healing PU film includes one selected from the group consisting of wood, metal, and glass.

In the present disclosure, in the double-layer self-healing PU film, the soft-layer PU film benefits from a reversible multiple hydrogen bond interaction existing in the polymer chain, and has desirable extensibility and could realize self-healing at ambient temperature. The hard-layer PU film benefits from a dynamic reversible non-covalent interaction in the polymer network structure, i.e., the synergistic effect of the multiple hydrogen bonds and the metal coordination bonds, and has high tensile strength, excellent toughness, and relative large Young's modulus. The soft-layer PU film is used as an inner layer, and the hard-layer PU film is used as an outer layer to obtain a double-layer self-healing PU film of "inner soft and external hard". The double-layer self-healing PU film has a remarkable self-healing ability at ambient temperature, and significantly-enhanced mechanical properties.

The present disclosure further provides a method for preparing the double-layer self-healing PU film, including the following steps:

subjecting a feed solution including the polyol substrate I, the diisocyanate I, and the tin-based catalyst I to prepolymerization I to obtain a prepolymerization product system I; mixing the prepolymerization product system I with a solution of the T-type chain extender to obtain a first mixture, and subjecting the first mixture to chain extension I-I to obtain a chain extension product system I-I; and mixing the chain extension product system I-I with the chain extender I to obtain a second mixture, and subjecting the second mixture to chain extension I-II to obtain the PU material I;

subjecting a feed solution including the polyol substrate II, the diisocyanate II, and the tin-based catalyst II to prepolymerization II to obtain a prepolymerization product system II; mixing the prepolymerization product system II with the solution of the T-type chain extender to obtain a third mixture, and subjecting the third mixture to chain extension II-I to obtain a chain extension product system II-I; mixing the chain extension product system II-I with a solution of the metal salt to obtain a fourth mixture, and subjecting the fourth mixture to coordination to obtain a coordination product system; and mixing the coordination product system with the chain extender II to obtain a fifth mixture, and subjecting the fifth mixture to chain extension II-II to obtain the PU material II; and coating the PU material I onto the surface of the matrix to obtain a PU material I film, and subjecting the PU material I film to drying I to obtain the soft-layer PU film; and coating the PU material II onto the surface of the soft-layer PU film to obtain a PU material II film, and subjecting the PU material II film to drying II to obtain the hard-layer PU film, thereby forming the double-layer self-healing PU film on the surface of the matrix.

In the present disclosure, a feed solution including the polyol substrate I, the diisocyanate I, and the tin-based catalyst I is subjected to prepolymerization I to obtain a prepolymerization product system I. In some embodiments, the polyol substrate I is mixed with a first organic solvent, and subjected to heating in a protective atmosphere to remove residual moisture, thereby avoiding interference caused by the excess moisture; and an obtained solution of the polyol substrate I is mixed with the diisocyanate I and the tin-based catalyst I, and subjected to the prepolymerization I. In some embodiments, the first organic solvent includes one selected from the group consisting of N,N-dimethylformamide, N,N-dimethylacetamide, toluene, and tetrahydrofuran. In some embodiments, the polyol substrate I and the first organic solvent are used at a ratio of (10-20) mmol:(15-40) mL, preferably 10 mmol:(15-20) mL. In some embodiments, the heating is conducted at 100° C. to 120° C., preferably 110° C. to 120° C. In some embodiments, the heating is conducted for 1 h to 2 h, preferably 1.5 h to 2 h. There is no special limitation on a type of a protective gas to provide the protective atmosphere, which may specifically be nitrogen. In some embodiments, after heating to remove the residual moisture, the solution of the polyol substrate I is cooled to 60° C. to 80° C., then mixed with the diisocyanate I and the tin-based catalyst II, and subjected to the prepolymerization I. In some embodiments, the prepolymerization I is conducted at 60° C. to 80° C., preferably 70° C. to 80° C. In some embodiments, the prepolymerization I is conducted for 3 h to 5 h, preferably 3 h to 4 h. During the prepolymerization I, under an action of the tin-based catalyst I, hydroxyl groups (—OH) of the polyol substrate I and isocyanate groups (—NCO) of the diisocyanate I undergo an addition reaction to form a diisocyanate containing polyesters or polyethers in the middle.

In the present disclosure, after obtaining the prepolymerization product system I, the prepolymerization product system I is mixed with a solution of the T-type chain extender to obtain a first mixture, and the first mixture is subjected to chain extension I-I to obtain a chain extension product system I-I. In some embodiments, the solution of the T-type chain extender is obtained by mixing the T-type chain extender with a second organic solvent. In some embodiments, the second organic solvent includes one selected from the group consisting of N,N-dimethylformamide, N,N-dimethylacetamide, toluene, and tetrahydrofuran. In some embodiments, the T-type chain extender and the second organic solvent are used at a ratio of (2-8) mmol:(10-20) mL, preferably (2-8) mmol:(10-15) mL. In some embodiments, a viscosity of the reactant is controlled by adjusting an amount of the second organic solvent to prevent gelation. In some embodiments, the solution of the T-type chain extender is added dropwise to the prepolymerization product system I; and there is no special limitation on a dropwise addition rate, and the dropwise addition rate well known to those skilled in the art could be adopted. In some embodiments, the chain extension I-I is conducted at 60° C. to 80° C., preferably 70° C. to 80° C. In some embodiments, the chain extension I-I is conducted for 2 h to 4 h, preferably 2 h to 3 h. During the chain extension I-I, dihydroxyl groups (—OH) at an end of the T-type chain extender could react with isocyanate groups (—NCO) at both ends of a prepolymer formed in the prepolymerization I to form a carbamate bond.

In the present disclosure, the chain extension product system I-I is mixed with the chain extender I to obtain a second mixture, and the second mixture is subjected to chain extension I-II to obtain the PU material I. In some embodiments, the chain extension product system I-I is cooled to ambient temperature (25° C.), and then the chain extender I is added dropwise to the chain extension product system I-I; and there is no special limitation on a dropwise addition rate, and the dropwise addition rate well known to those skilled in the art could be adopted. In some embodiments, the chain extension I-II is conducted at 40° C. to 60° C., preferably 40° C. to 50° C. In some embodiments, the chain extension I-II is conducted for 3 h to 5 h, preferably 3 h to 4 h. In some embodiments, the chain extension I-II is conducted in a protective atmosphere. During the chain extension I-II, the chain extender I further completely reacts with the remaining isocyanate groups (—NCO) in the chain-extended product system I-I to finally generate the PU material I.

In the present disclosure, after obtaining the PU material I, the PU material I is coated on a surface of a matrix to obtain a PU material I film, and the PU material I film is subjected to drying I to obtain a soft-layer PU film. There is no special limitation on a coating method, and a method well known to those skilled in the art can be used, such as spray coating or scrape coating. In some embodiments, the drying I is conducted at 60° C. to 80° C., preferably 70° C. to 80° C. In some embodiments, the drying I is conducted for 24 h to 48 h, preferably 36 h to 48 h. In some embodiments, the drying I is conducted under vacuum and standing still. During the drying I, the organic solvent in the PU material I is volatilized, and finally a soft-layer PU film is obtained.

In the present disclosure, a feed solution including the polyol substrate II, the diisocyanate II, and the tin-based catalyst II is subjected to prepolymerization II to obtain a prepolymerization product system II; the prepolymerization product system II is mixed with the solution of the T-type chain extender to obtain a third mixture, and the third mixture is subjected to chain extension II-I to obtain a chain extension product system II-I. In some embodiments, the operating conditions of the prepolymerization II and the chain extension II-I are consistent with those of the prepolymerization I and the chain extension I-I, and are not repeated here.

In the present disclosure, after obtaining the chain extension product system II-I, the chain extension product system II-I is mixed with a solution of the metal salt to obtain a fourth mixture, and the fourth mixture is subjected to coordination to obtain a coordination product system. In some embodiments, the solution of the metal salt is obtained by mixing a metal salt with a third organic solvent. In some embodiments, the third organic solvent includes one selected from the group consisting of N,N-dimethylformamide, N,N-dimethylacetamide, toluene, and tetrahydrofuran. In some embodiments, the metal salt and the third organic solvent are used at a ratio of (2.5-10) mmol:(5-10) mL, preferably (2.5-5):5 mL. In some embodiments, the coordination is conducted at 40° C. to 60° C., preferably 40° C. to 50° C. In some embodiments, the coordination is conducted for 5 h to 12 h, preferably 5 h to 8 h. During the coordination, after the metal salt is added, the metal ion coordinates with N atoms on a pyridine ring in the T-type chain extender to form metal coordination bonds.

In the present disclosure, after obtaining the coordination product system, the coordination product system is mixed with the chain extender II to obtain a fifth mixture, and the fifth mixture is subjected to chain extension II-II to obtain the PU material II. In some embodiments, the operating conditions of the chain extension II-II are consistent with those of the chain extension I-II, and are not repeated here.

In the present disclosure, obtaining the PU material II and the soft-layer PU film, the PU material II is coated on the surface of the soft-layer PU film to obtain a PU material II film, and the PU material II film is subjected to drying II to obtain the hard-layer PU film, thereby forming the double-layer self-healing PU film on the surface of the matrix. In some embodiments, a method of coating the PU material II and operating conditions of the drying II each are consistent with the method of coating the PU material I and the operating conditions of the drying I respectively, and are not repeated here.

In examples of the present disclosure, specifically, the PU material I is poured into a polytetrafluoroethylene flat mold and subjected to the drying I to obtain the soft-layer PU film; and the PU material II is poured into the polytetrafluoroethylene flat mold containing the soft-layer PU film, and subjected to the drying II, to form a hard-layer PU film on the surface of the soft-layer PU film, thereby obtaining the double-layer self-healing PU film.

The present disclosure further provides use of the double-layer self-healing PU film described in the above technical solutions or a double-layer self-healing PU film prepared by the method described in the above technical solutions in a protective coating, electronic skin, or a self-healing electrode.

FIG. 1 is a schematic diagram showing that the double-layer self-healing PU film prepared according to an embodiment the present disclosure is used as a protective coating. Taking a metal matrix as an example, a double-layer self-healing PU film (Janus self-healing PU film) is prepared on a surface of the metal matrix, wherein the soft-layer PU film is used as an inner layer, and the hard-layer PU film is used as an outer layer.

The technical solutions of the present disclosure will be clearly and completely described below with reference to the examples of the present disclosure. Apparently, the described examples are only a part of, not all of, the embodiments of the present disclosure. All other embodiments obtained by those of ordinary skill in the art based on the embodiments of the present disclosure without creative efforts shall fall within the protection scope of the present disclosure.

Figure 2:
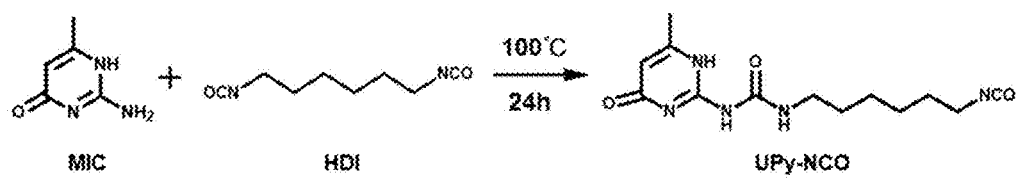
FIG. 2 shows a flow chart for preparing a T-type chain extender.
Figure 2:
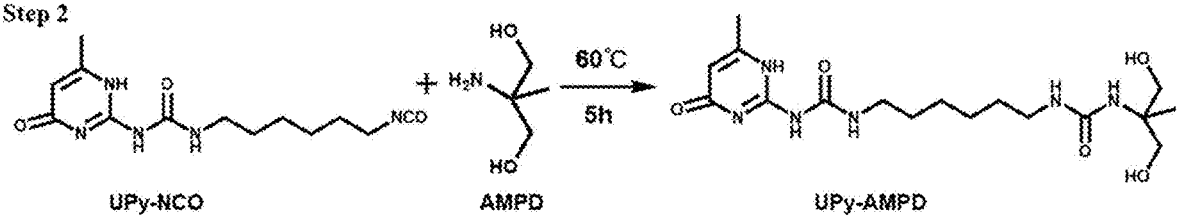

The T-type chain extender adopted in the following examples and comparative examples was prepared by a method according to a literature (R. P. Sijbesma; F. H. Beijer; L. Brunsveld; B. J. B. Folmer; J. Hirschberg; R. F. M. Lange; J. K. L. Lowe; E. W. Meijer, *Science* 1997, 278, 1601; Y Song, Y Liu, T. Qi, G. L. Li, *Angew. Chem. Int. Ed.* 2018, 57, 13838), and a reaction flow chart thereof is shown in FIG. 2. The method was conducted by the following steps:

2-amino-4-hydroxy-6-methylpyrimidine and HMDI were added into a round-bottomed flask at a molar ratio of 1:6, and stirred at 100° C. for 24 h in an $N_2$ atmosphere. The obtained product system was cooled to ambient temperature, and n-pentane was added thereto to precipitate a product to obtain a precipitate, and remove excess unreacted HMDI. The precipitate was washed with n-pentane 3 times, and then dried in vacuum at 50° C. for 24 h to obtain isocyanate-terminated 2-urea-4[H]-pyrimidinone, which is denoted as UPy-NCO.

The UPy-NCO, 2-amino-2-methyl-1,3-propylene glycol (a molar ratio of the UPy-NCO to 2-amino-2-methyl-1,3-propylene glycol was 1:1.56), and anhydrous chloroform were added into a round-bottomed flask equipped with a condenser, and refluxed at 60° C. for 5 h under an $N_2$ atmosphere to obtain a milky white turbid liquid. The milky white turbid liquid was subjected to vacuum suction filtration to obtain a first filter cake. The first filter cake was washed with chloroform 3 times to obtain a washed material. The washed material was dissolved in N,N-dimethylacetamide, and then centrifugated at 9,000 r/min for 10 min, and a supernatant was collected. Diethyl ether was added into the supernatant to precipitate a product, and the resulting mixture was subjected to suction filtration to obtain a second filter cake. The second filter cake was subjected to vacuum-drying at 50° C. for 24 h, obtaining a white product, which is denoted as UPy-AMPD, namely the T-type chain extender.

Comparative Example 1

10.00 g of polytetramethylene glycol with a molecular weight of 1,000 g/mol (PTMG-1000, 10 g, 10 mmol) was mixed with 15 mL of N,N-dimethylacetamide serving as a solvent, and the resulting mixture was then placed in a three-necked flask, and stirred for 2 h in an oil bath at 120° C. under an $N_2$ atmosphere to obtain a polytetramethylene glycol solution. The polytetramethylene glycol solution was cooled to 80° C., and isophorone diisocyanate (IPDI, 4.45 g, 20 mmol) and dibutyltin dilaurate (DBTDL, 0.063 g, 1 mmol) were then added to the cooled polytetramethylene glycol solution in the $N_2$ atmosphere, and then subjected to reaction at 80° C. for 3 h while stirring to obtain a prepolymer.

A T-type chain extender (UPy-AMPD, 0.796 g, 2 mmol) was dissolved in 10 mL of N,N-dimethylacetamide serving as a solvent, and ultrasonically treated for 30 min to completely dissolve the UPy-AMPD to obtain a UPy-AMPD solution. Under stirring at 80° C., the UPy-AMPD solution was added dropwise to the prepolymer, and an obtained mixture was subjected to reaction at 80° C. for 3 h while stirring to obtain a chain extension product system.

The chain extension product system was cooled to ambient temperature (25° C.), polyetheramine D230 (1.84 g, 8 mmol) was added dropwise to the cooled chain extension product system, and the resulting system was subjected to reaction for another 4 h at 40° C. under the $N_2$ atmosphere while stirring to obtain a PU material. The PU material was poured into a polytetrafluoroethylene flat mold, and dried at 80° C. under vacuum in a standing state for 48 h, obtaining a PU film (referred to as SPU-1) with a thickness of 0.4 mm.

Comparative Example 2

A prepolymer was prepared according to the method of Comparative Example 1.

A T-type chain extender (UPy-AMPD, 1.99 g, 5 mmol) was dissolved in 20 mL of N,N-dimethylacetamide serving as a solvent, and ultrasonically treated for 30 min to completely dissolve the UPy-AMPD to obtain a UPy-AMPD solution. Under stirring at 80° C., the UPy-AMPD solution was added dropwise to the prepolymer, and an obtained mixture was subjected to reaction at 80° C. for 3 h while stirring to obtain a chain extension product system.

A $ZnCl_2$ solid (0.68 g, 5 mmol) was dissolved in 5 mL of N,N-dimethylacetamide serving as a solvent, and ultrasonically treated for 30 min to completely dissolve the $ZnCl_2$ to obtain a $ZnCl_2$ solution. Under stirring at 40° C., the $ZnCl_2$ solution was added dropwise to the chain extension product system, and an obtained mixture was subjected to reaction at 40° C. for 5 h while stirring to obtain a zinc-containing product system.

The zinc-containing product system was cooled to ambient temperature (25° C.), polyetheramine D230 (1.15 g, 5 mmol) was added dropwise to the cooled zinc-containing product system, and the resulting mixture was subjected to reaction for another 4 h at 40° C. while stirring under an $N_2$ atmosphere to obtain a PU material. The PU material was poured into a polytetrafluoroethylene flat mold, and dried at 80° C. under vacuum in a standing state for 48 h, obtaining a PU film (referred to as SPU-2) with a thickness of 0.4 mm.

Example 1

A PU film SPU-1 was prepared according to the method of Comparative Example 1. A PU material prepared according to the method of Comparative Example 2 was poured on the PU film SPU-1, and dried at 80° C. under vacuum in a standing state for 48 h, obtaining a double-layer self-healing PU film (referred to as SPU-3) with a thickness of 0.8 mm.

Comparative Example 3

A PU film was prepared according to the method of Comparative Example 1, except that the T-type chain extender was used in an amount of 3.184 g (8 mmol), 20 mL of N,N-dimethylacetamide was used to dissolve the T-type chain extender, and polyetheramine D230 was used in an amount of 0.46 g (2 mmol). The final obtained PU film is denoted as SPU-4, and has a thickness of 0.4 mm.

Comparative Example 4

A PU film was prepared according to the method of Comparative Example 2, except that the $ZnCl_2$ solid was used in an amount of 0.34 g (2.5 mmol). The final obtained PU film is denoted as SPU-5, and has a thickness of 0.4 mm.

Test Example 1

Figure 3:
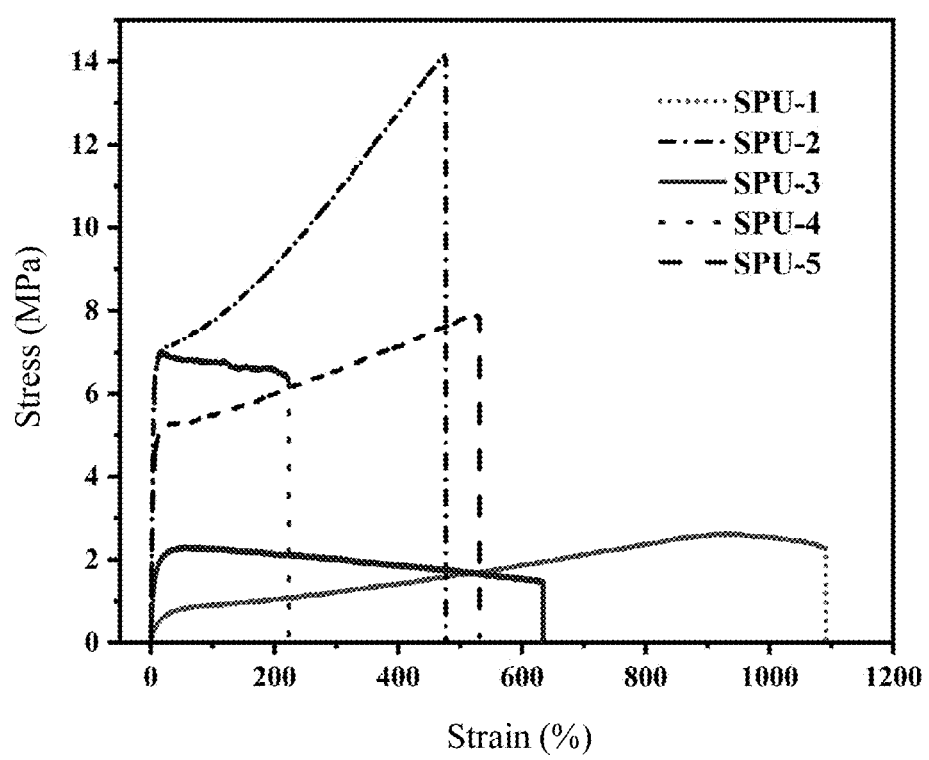
FIG. 3 shows a stress-strain curve of the PU films prepared according to Comparative Examples 1 to 2 and Example 1.

In order to effectively evaluate the mechanical properties of the PU film, the SPU-1, SPU-2, SPU-3, SPU-4, and SPU-5 prepared according to Comparative Examples 1 to 4 and Example 1 were subjected to a stress-strain curve test according to a test standard GB/T 1040-2006 at a test speed of mm/min and a test temperature of 25° C. The test results are compared. The results are shown in FIG. 3, and the specific data is summarized in Table 1.

Figure 4:
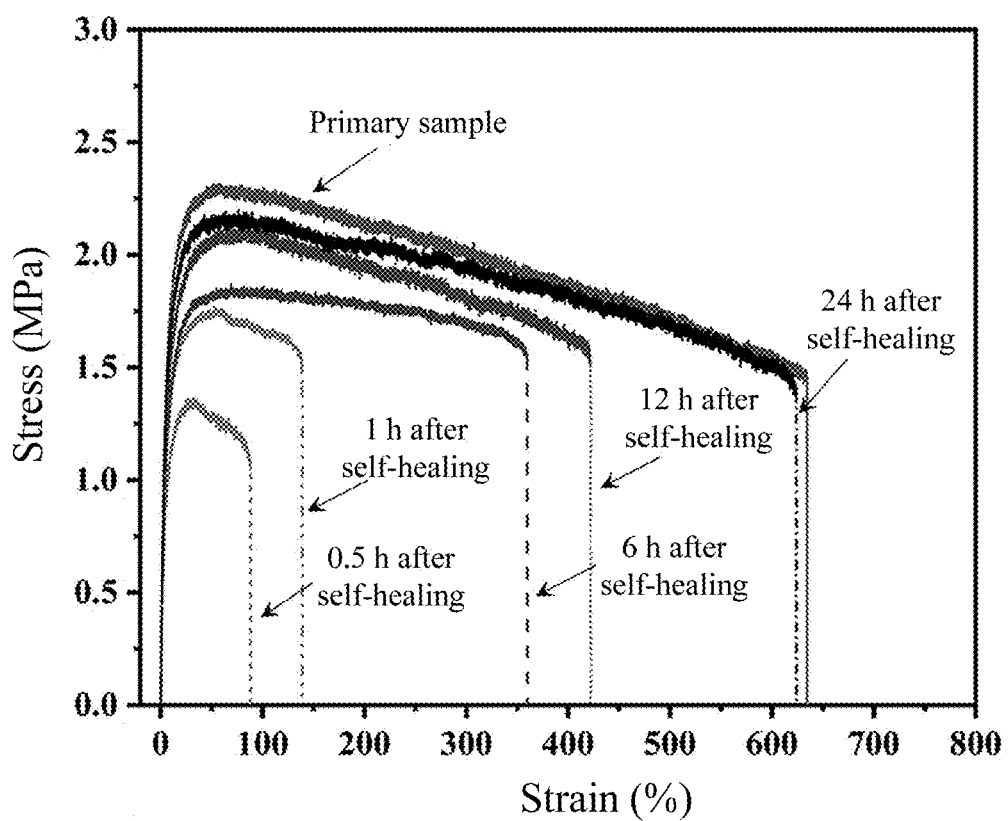
FIG. 4 shows a stress-strain curve of the PU film prepared according to Example 1 under different repair times.

In addition, the self-healing performance of the SPU-3 prepared according to Example 1 was also tested according to a test standard GB/T 1040-2006 at a test speed of 10 mm/min and a test temperature of 25° C. The mechanical properties data under different repair times is summarized in Table 2. The self-healing efficiency data of SPU-3 at different times (test temperature: 25° C.) is summarized in Table 3. The stress-strain curve is shown in FIG. 4.

TABLE 1

Elongation at break, ultimate tensile strength, and toughness of SPU-1, SPU-2, SPU-3, SPU-4, and SPU-5

| Sample | Strength (MPa) | Elongation at break (%) | Toughness (MJ/m³) |
|---|---|---|---|
| SPU-1 | 2.64 | 1091.32 | 18.96 |
| SPU-2 | 14.15 | 476.93 | 47.57 |
| SPU-3 | 2.31 | 634.44 | 12.27 |
| SPU-4 | 6.99 | 223.00 | 14.75 |
| SPU-5 | 7.88 | 532.00 | 33.90 |

TABLE 2

Mechanical properties of SPU-3 at different self-healing times

| Self-healing time (h) | Strength (MPa) | Elongation at break (%) | Toughness (MJ/m³) |
|---|---|---|---|
| Primary sample | 2.31 | 634 | 12.27 |
| 0.5 | 1.37 | 88 | 1.06 |
| 1 | 1.77 | 139 | 2.23 |
| 6 | 1.87 | 360 | 6.23 |
| 12 | 2.13 | 422 | 7.89 |
| 24 | 2.20 | 624 | 11.65 |

Considering the three factors of strength, toughness, and elongation at break, a self-healing efficiency SE (%) was calculated according to formula I:

$$SE(\%) = P_{repaired}/P_{primary} \times 100\% \quad \text{formula I}$$

in the formula I, P represents the strength, elongation at break, or toughness.

As shown in FIG. 3 and Table 1, the SPU-1 exhibits extremely-high tensile properties, and has a maximum tensile strength of 2.64 MPa, a fracture strain of 1091.32%, and a toughness of 18.96 MJ/m³. Therefore, the SPU-1 as an inner layer of the double-layer self-healing PU film could endow the PU film with high mechanical strength, desirable wear resistance, and damage resistance. Here, the content of the T-type chain extender containing quadruple hydrogen bonds has a significant effect on the mechanical properties of PU films. Due to effective energy dissipation, non-covalent PU exhibits remarkable mechanical toughening effect and excellent ambient temperature self-healing ability under external force. Therefore, the SPU-1 as an inner layer of the double-layer self-healing PU film could endow the PU film with excellent self-healing ability and high stretchability. The SPU-2 has outstanding mechanical properties, with a maximum tensile strength of 14.15 MPa, a fracture strain of 476.93%, and a toughness of 47.57 MJ/m³. SPU-2 not only has dynamic and dense multiple hydrogen bond interactions, but also forms metal coordination bonds between the zinc ions and T-type chain extender in the system due to the incorporation of zinc salts. The $Zn^{2+}$ coordination bonds introduced in the SPU-2 could limit the mobility of the mobile phase and enhance the crystallinity and network density of the chain segments, and could effectively adjust the mechanical strength and self-healing performance of the PU. The synergistic effect of dynamic and dense hydrogen bond interactions and metal coordination bonds could enhance mechanical properties of the PU material. Therefore, the SPU-2 as an outer layer of the double-layer self-healing PU film could endow the PU film with high mechanical strength, desirable wear resistance, and damage resistance. The SPU-3 prepared based on the SPU-1 and SPU-2 has an interlayer distribution of "inner soft and external hard", and has remarkable self-healing ability at ambient temperature and significantly-enhanced mechanical properties.

In addition, by comparing the SPU-1 prepared according to Comparative Example 1 and the SPU-4 prepared according to Comparative Example 3, it can be seen that after adjusting a ratio of the T-type chain extender to polyetheramine D230, the mechanical properties of the PU film are significantly changed. The SPU-4 has a higher strength than that of the SPU-1, but shows a decreased elongation at break, such that the SPU-4 might has decreased self-healing performance. By comparing the SPU-2 prepared according to Comparative Example 2 and the SPU-5 prepared according to Comparative Example 4, it can be seen that after adjusting an amount of the metal ions added, the mechanical properties of the PU film are also changed significantly. The SPU-5 has a higher elongation at break than that of the SPU-2, but shows a lower strength somewhat.

As shown in FIG. 4 and Table 2, the SPU-3 exhibits a desirable ambient temperature self-healing ability. At ambient temperature, a dumbbell-shaped sample is cut from the middle; after 0.5 h, the properties of the SPU-3 recovers to a certain extent, wherein the SPU-3 has a tensile strength of 1.37 MPa, an elongation at break of 88%, and a low toughness of 1.06 MJ/m³. As the repair time increases, the strength and elongation at break of the SPU-3 also increases. This is due to the reversible non-covalent interactions in the polymer network structure, which could effectively limit the movement of molecular segments in the polymer system, enhance the crystallinity and network density of the segments, and effectively adjust the mechanical strength and self-healing composite performance of the PU material. After the self-healing time reached 24 h, the mechanical properties of the SPU-3 basically recover, and the self-healing efficiencies of strength, toughness, and elongation at break could reach 95.24%, 94.95%, and 98.36%, respectively.

Comparative Example 5

Referring to the literature (Jianhui Wang, Yueju Zhao, Yongli Zheng, Jinbiao Shi, Jilin Teng; *Preparation and characterization of a self-healing polyurethane* [J], *Thermosetting Resin*, 2021, 36(01):23-26), a PU material was prepared by the following steps:

Polypropylene glycol (PPG-2000, 6 mmol) with a molecular weight of 2,000 g/mol was vacuum-dehydrated at 110° C. for 2 h to remove residual moisture to avoid interference of excess water on the experiment. Diphenylmethane diisocyanate (MDI, 3 mmol) was dissolved in ethyl acetate (10 g) to obtain an MDI solution, and 2 drops of dibutyltin dilaurate (DBTDL) were added to the MDI solution, and mixed well to obtain a first mixture. The first mixture was added to the PPG-2000 to obtain a mixed feed solution. Toluene diisocyanate (TDI, 6 mmol) was added to the mixed feed solution to obtain a second mixture. The second mixture was further subjected to reaction at a constant temperature of 70° C. for 1.5 h to obtain a —NCO-terminated PPG-2000 prepolymer.

The —NCO-terminated PPG-2000 prepolymer was cooled to ambient temperature in a water bath, and diluted with ethyl acetate (50 g) to obtain a reaction system with a mass fraction of of the —NCO-terminated PPG-2000 prepolymer of 20%. Isophoronediamine (IPDA, 3 mmol) was dissolved in ethyl acetate (15 g) to obtain an IPDA solution, and then the IPDA solution was added dropwise into the reaction system to obtain a mixed feed solution. The mixed feed solution was poured into a polytetrafluoroethylene flat mold, and dried under vacuum, obtaining a PU film with a thickness of 0.4 mm.

Comparative Example 6

A PU film was prepared according to the method of Comparative Example 5, except that the polypropylene glycol had a molecular weight of 1,000 g/mol. The final obtained PU film has a thickness of 0.4 mm.

Table 3 shows the self-healing performance test data of the PU films prepared according to Comparative Example 5 and Comparative Example 6.

TABLE 3

Self-healing performance test data of PU films prepared according to Comparative Example 5 and Comparative Example 6

| Condition | Strength (MPa) | | Elongation at break (%) | |
| --- | --- | --- | --- | --- |
| | Comparative Example 5 | Comparative Example 6 | Comparative Example 5 | Comparative Example 6 |
| Initial | 8.90 | 1.31 | 1300 | 2550 |
| 40° C./ 3 h | 2.05 (Self-healing efficiency: 23%) | 0.94 (Self-healing efficiency: 72%) | 300 | 1040 |
| Ambient temperature/ 24 h | 2.52 (Self-healing efficiency: 28%) | 1.27 (Self-healing efficiency: 97%) | 400 | 900 |

It can be concluded from Table 3 that:

(1) The strength of the PU film prepared according to Comparative Example 5 is significantly higher than that of the PU film prepared according to Comparative Example 6, but the elongation at break is lower than that of the PU film prepared according to Comparative Example 6.

(2) The PU film prepared according to Comparative Example 5 has a low self-healing efficiency, showing a self-healing efficiency at 40° C./3 h of only 23%, and a self-healing efficiency at ambient temperature/24 h of only 28%. The double-layer self-healing PU film according to the present disclosure has a self-healing efficiency of not less than 98% at ambient temperature/24 h, showing obvious self-healing advantages at ambient temperature. In addition, Comparative Example 5 has a maximum strength of 8.90 MPa, which is also significantly lower than that of 14.15 MPa of the hard-layer PU film in the double-layer self-healing PU film. Therefore, in terms of mechanical properties, the double-layer self-healing PU film also exhibits significant advantages.

(3) The PU film prepared according to Comparative Example 6 has a self-healing efficiency of only 72% at 40° C./3 h, but has a self-healing efficiency of as high as 97% at ambient temperature/24 h. However, the PU film prepared according to Comparative Example 6 has a relative low strength, with an initial maximum strength of 1.31 MPa, and a maximum strength after repair of only 1.27 MPa. The low mechanical strength is difficult to meet the practical application requirements of fields such as protective coatings, and electronic skin. The soft-layer PU film in the double-layer self-healing PU film has a maximum tensile strength of 2.64 MPa, showing better mechanical properties. Meanwhile, the double-layer self-healing PU film also shows an extremely high self-healing efficiency at ambient temperature.

Test Example 2

Figure 5:
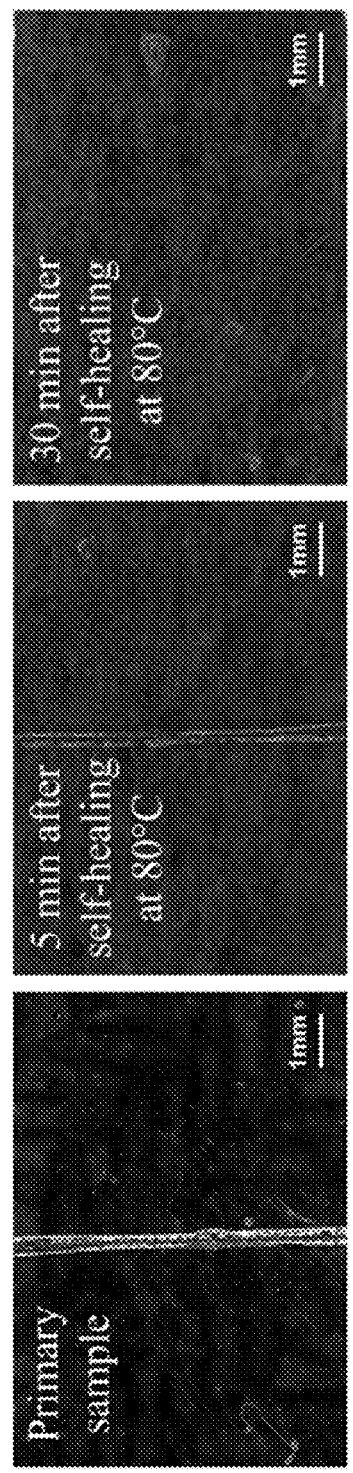
FIG. 5 shows an optical microscope image of a self-healing process of the PU film prepared according to Example 1 with cracks.

The SPU-3 prepared according to Example 1 was cut into two sections, and then the two sections were spliced together to obtain an SPU-3 with cracks. The SPU-3 with cracks was subjected to self-healing at 80° C., and a self-healing process was observed at different times with an optical microscope. The results are shown in FIG. 5. It can be seen from FIG. 5 that at 80° C., the crack marks of the SPU-3 are obviously weakened after 5 min of self-healing; after 30 min of self-healing, the cracks almost completely disappeared under the optical microscope, thus fully proving that the SPU-3 has a rapid self-healing function.

From the above examples and comparative examples, it can be seen that in the present disclosure, the T-type chain extender is used to form supramolecular PU, and the coordination of hydrogen bonds of the main chain and side chain in the polymer network through the chain extension, thereby realizing the self-healing properties of the polymer. The double-layer self-healing PU film having "inner soft and external hard" is obtained through a preparation process of "soft layer/hard layer compounding", and scratches on the surface of the double-layer self-healing PU film could be rapidly repaired at ambient temperature. For the hard-layer PU film, $ZnCl_2$ forms dense metal coordination bonds on the surface of the hard-layer PU film, which greatly improves the surface hardness, scratch resistance, and damage resistance. The soft-layer PU film has a desirable bonding strength and could maintain well adhesion with the matrix; the multiple hydrogen bonds endow the material with an excellent self-healing ability at ambient temperature, which provides an important guarantee for the rapid self-healing of the PU material. In addition, the self-healing ability of the double-layer self-healing PU film is tested. The results show that after self-healing at ambient temperature for 24 h, scratches on the surface of the double-layer self-healing PU film are completely disappeared, and mechanical properties of the film are recovered by not less than 95%.

The above descriptions are merely preferred embodiments of the present disclosure. It should be noted that a person of ordinary skill in the art may further make several improvements and modifications without departing from the principle of the present disclosure, but such improvements and modifications shall be deemed as falling within the protection scope of the present disclosure.

What is claimed is:

1. A double-layer self-healing polyurethane (PU) film, comprising
   a soft-layer PU film arranged on a surface of a matrix; and
   a hard-layer PU film arranged on a surface of the soft-layer PU film,
   wherein the soft-layer PU film is prepared from a PU material I of a self-healing PU material; and the hard-layer PU film is prepared from a PU material II of the self-healing PU material;
   the PU material I is prepared from raw materials comprising a polyol substrate I, a diisocyanate I, a tin-based catalyst I, a T-type chain extender, and a chain extender I at a molar ratio of (10-20): (20-40):(1-3):(2-8):(8-12);
   the PU material II is prepared from raw materials comprising a polyol substrate II, a diisocyanate II, a tin-based catalyst II, the T-type chain extender, a metal salt, and a chain extender II at a molar ratio of (10-20):(20-40):(1-3):(5-10):(2.5-10):(5-10); a metal ion in the metal salt being one or more selected from the group consisting of $Zn^{2+}$, $Cu^{2+}$, and $Fe^{3+}$;
   the polyol substrate I and the polyol substrate II each are independently selected from the group consisting of a polyester polyol and a polyether polyol; and
   the T-type chain extender has a structure represented by formula A:

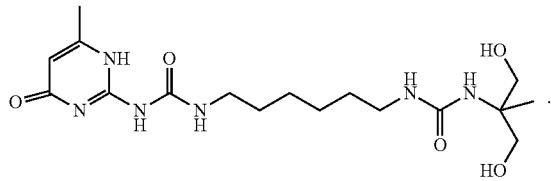

formula A

2. The double-layer self-healing PU film of claim 1, wherein the polyol substrate I and the polyol substrate II each independently have a molecular weight of 1,000 g/mol to 2,000 g/mol.

3. The double-layer self-healing PU film of claim 1, wherein the diisocyanate I and the diisocyanate II each independently comprise one selected from the group consisting of hexamethylene diisocyanate (HMDI), isophorone diisocyanate (IPDI), and diphenylmethane diisocyanate (MDI).

4. The double-layer self-healing PU film of claim 1, wherein the tin-based catalyst I and the tin-based catalyst II each are dibutyltin dilaurate (DBTDL).

5. The double-layer self-healing PU film of claim 1, wherein the chain extender I and the chain extender II each independently comprise one selected from the group consisting of polyetheramine D230, 1,4-butanediol, ethylene glycol, and propylene glycol.

6. The double-layer self-healing PU film of claim 1, wherein the soft-layer PU film and the hard-layer PU film each independently have a thickness of 0.3 mm to 0.6 mm.

7. A method for preparing a double-layer self-healing PU film, wherein the double-layer self-healing PU film comprises a soft-layer PU film arranged on a surface of a matrix; and
   a hard-layer PU film arranged on a surface of the soft-layer PU film,
   wherein the soft-layer PU film is prepared from a PU material I of a self-healing PU material; and the hard-layer PU film is prepared from a PU material II of the self-healing PU material;
   the PU material I is prepared from raw materials comprising a polyol substrate I, a diisocyanate I, a tin-based catalyst I, a T-type chain extender, and a chain extender I at a molar ratio of (10-20): (20-40):(1-3):(2-8):(8-12);
   the PU material II is prepared from raw materials comprising a polyol substrate II, a diisocyanate II, a tin-based catalyst II, the T-type chain extender, a metal salt, and a chain extender II at a molar ratio of (10-20):(20-40):(1-3):(5-10):(2.5-10):(5-10); a metal ion in the metal salt being one or more selected from the group consisting of $Zn^{2+}$, $Cu^{2+}$, and $Fe^{3+}$;
   the polyol substrate I and the polyol substrate II each are independently selected from the group consisting of a polyester polyol and a polyether polyol; and
   the T-type chain extender has a structure represented by formula A:

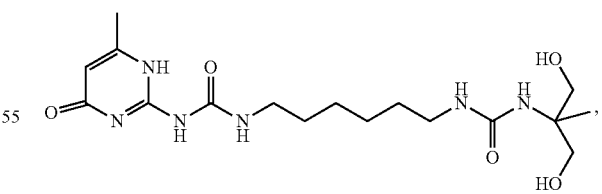

formula A and
the method comprises the following steps:
   subjecting a feed solution comprising the polyol substrate I, the diisocyanate I, and the tin-based catalyst I to prepolymerization I to obtain a prepolymerization product system I; mixing the prepolymerization product system I with a solution of the T-type chain extender to obtain a first mixture, and subjecting the first mixture to chain extension I-I to obtain a chain extension product system I-I; and mixing the chain extension product system I-I with the chain extender I to obtain a second mixture, and subjecting the second mixture to chain extension I-II to obtain the PU material I;

subjecting a feed solution comprising the polyol substrate II, the diisocyanate II, and the tin-based catalyst II to prepolymerization II to obtain a prepolymerization product system II; mixing the prepolymerization product system II with a solution of the T-type chain extender to obtain a third mixture, and subjecting the third mixture to chain extension II-I to obtain a chain extension product system II-I; mixing the chain extension product system II-I with a solution of the metal salt to obtain a fourth mixture, and subjecting the fourth mixture to coordination to obtain a coordination product system; and mixing the coordination product system with the chain extender II to obtain a fifth mixture, and subjecting the fifth mixture to chain extension II-II to obtain the PU material II; and coating the PU material I onto the surface of the matrix to obtain a PU material I film, and subjecting the PU material I film to drying I to obtain the soft-layer PU film; and coating the PU material II onto the surface of the soft-layer PU film to obtain a PU material II film, and subjecting the PU material II film to drying II to obtain the hard-layer PU film, thereby forming the double-layer self-healing PU film on the surface of the matrix.

8. The method of claim 7, wherein the coordination is conducted at a temperature of 40° C. to 60° C. for 5 h to 12 h.

9. The method of claim 7, wherein the polyol substrate I and the polyol substrate II each independently have a molecular weight of 1,000 g/mol to 2,000 g/mol.

10. The method of claim 7, wherein the diisocyanate I and the diisocyanate II each independently comprise one selected from the group consisting of HMDI, IPDI, and MDI.

11. The method of claim 7, wherein the tin-based catalyst I and the tin-based catalyst II each are DBTDL.

12. The method of claim 7, wherein the chain extender I and the chain extender II each independently comprise one selected from the group consisting of polyetheramine D230, 1,4-butanediol, ethylene glycol, and propylene glycol.

13. The method of claim 7, wherein the soft-layer PU film and the hard-layer PU film each independently have a thickness of 0.3 mm to 0.6 mm.

* * * * *